United States Patent [19]

von Maydell et al.

[11] Patent Number: 4,675,677
[45] Date of Patent: Jun. 23, 1987

[54] METHOD AND SYSTEM FOR DETECTING AND COMBATING COVERED GROUND TARGETS

[75] Inventors: Ignaz von Maydell, Munich; Juergen Detlefsen, Berg; Alfred Blaha, Haar, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 767,132

[22] Filed: Aug. 19, 1985

[30] Foreign Application Priority Data

Aug. 22, 1984 [DE] Fed. Rep. of Germany ....... 3430888

[51] Int. Cl.$^4$ .............................................. G01S 13/90
[52] U.S. Cl. ...................................... 342/25; 342/61; 342/189
[58] Field of Search ............ 343/5 CM, 5 FT, 5 MM, 343/5 PD, 5 SA, 7 G; 342/25, 61-72, 195, 196

[56] References Cited

U.S. PATENT DOCUMENTS 3,614,778 10/1971 Graham et al. ............. 343/5 CM X
4,551,724 11/1985 Goldstein et al. ............... 343/5 CM
4,602,336 7/1986 Brown ........................ 343/5 MM X

FOREIGN PATENT DOCUMENTS 3023290 3/1982 Fed. Rep. of Germany .

OTHER PUBLICATIONS

Introduction to Radar Systems, Merrill I. Skolnik, McGraw-Hill Book Co., 1980, pp. 517-529.
An Article entitled "Introduction to Fourier Optics" by Joseph W. Goodman, Depart. of Electrical Engineering, Stamford University, pp. 198-205, published by McGraw-Hill Book Co., (1968).

Primary Examiner—T. H. Tubbesing
Assistant Examiner—Bernarr Earl Gregory
Attorney, Agent, or Firm—W. G. Fasse; D. H. Kane, Jr.

[57] ABSTRACT

A system for manned or unmanned flying bodies detects covered or hidden targets on the ground by using relatively "longwave" radar radiation for immediately attacking such ground targets, which may be covered by trees for example, but located on a strip of ground extending with a given width below the flight path of the flying body travelling in low altitude flight. Four radar receiver antennas are equally spaced from each other along the wings of the flying body and one transmitter antenna is located between two pairs of receiver antennas. The receiver signals are submitted by a fast Fourier transformation for providing a wavefront reconstruction. The so transformed, received signals are then evaluated in accordance with the known SAR principle directly as the signals are received and transformed by correlation with expected signal functions, so-called reference function, for producing a control signal for the direct or indirect discharge of a weapon.

3 Claims, 8 Drawing Figures

METHOD AND SYSTEM FOR DETECTING AND COMBATING COVERED GROUND TARGETS

FIELD OF THE INVENTION

The invention relates to a method and system for detecting and combating targets, such as covered or hidden ground targets, by flying bodies such as aircraft or drones flying at a low altitude. The present method and system utilizes radar radiation emitted by conventional synthetic-aperture-radar (SAR) with an antenna array. The target detection is achieved in a direction sideways and/or at an angle forward and toward the ground with respect to the flight direction.

DESCRIPTION OF THE PRIOR ART

It is known, to detect targets by using the synthetic-aperture-radar principle (SAR), whereby a very high resolution in the cross-direction (perpendicular) to the flight path of the aircraft carrying the radar system is achieved, (see M. I. Skolnik: "Introduction To Radar Systems", Section 14.1; second Edition 1980; McGraw-Hill). In such a prior art system the large antenna aperture synthetically achieved through the motion of the aircraft is fully utilized. An exact analysis of the received signals may be achieved with conventional means and a customary effort, whereby the achievable resolution is on the same order of magnitude as the size of the antenna dimensions.

Furthermore, the literature (M. I. Skolnik:"Introduction To Radar Systems", page 527) describes the possibility of detecting ground targets lying laterally next to the flight path of the aircraft, by means of an antenna arrangement directed forwardly at an angle relative to the flight path. However, this method, also known as "SQUINT-Mode", requires a substantially higher expenditure and effort for the analysis of signals than is required by the SAR-principle.

The German Patent Publication (DE-OS) No. 3,023,290 describes an arrangement for target acquisition of moving and stationary ground targets from low-flying aircraft. The arrangement utilizes four IR-sensor rows, which are mounted in pairs on the right and left wing tips, for detecting targets which may be recognized by their infrared radiation. However, this method cannot be used to detect targets which are covered, for example under trees.

The utilization of the SAR-principle for the present purpose, without any modification, has the disadvantage that only a portion of its synthetic aperture is useful, since the radar image of a ground target must already be on hand when the aircraft has detected the target lying in front of it at the decision making distance for activating a weapon. Furthermore, in utilizing SAR, a right or left decision with reference to any lateral deviation of the target from the straight flight path is not possible since this information is not contained in the Doppler signals.

OBJECTS OF THE INVENTION

In view of the above it is the aim of the invention to achieve the following objects singly or in combination:

to provide a method and/or system for monitoring strips of ground, by flying bodies in low altitude flight, whereby such a ground strip has a length at an angle forwardly along the flight path of the flying body and a width corresponding approximately to one or several span widths of the flying body, especially for the high resolution search of ground targets such as military transport and combat vehicles which may be under cover, for example under trees;

to improve such a system so as to be independent of weather and visibility conditions to permit an immediate attack of a target by aiming downwardly;

to make full use of the synthetic aperture of an SAR-system and to provide a "right or left" information suitable for making a respective right or left decision;

to provide such a system in a manned or unmanned flying body for determining target location data for the immediate aimed attack on ground targets from above including covered or hidden ground targets, or for the transmission and storage of such target location data for later use; and to achieve a simple and efficient system for the acquisition, evaluation, and storage of data for the present purposes of combating targets especially targets under cover.

SUMMARY OF THE INVENTION

The above objects have been achieved according to the invention in a method or system for detecting and combating covered or hidden ground targets. The transmitter and receiver arrangement of the system comprises an antenna array arranged horizontally on the flying body for radiating downwardly at a predetermined angle relative to the roll axis. The antenna array works at relatively "long wave" radar frequencies in the range of 500 to 1200 MHz and has preferably four receiving antennas and one transmitting antenna, whereby the individual receiving antennas of the antenna array are spaced at a distance from each other which is considerably larger than half a wave length of the operating frequency. The evaluation of the radar signals reflected by the targets and received by the antenna array is achieved in the azimuth plane by wave front reconstruction circuit means. The evaluation of the received radar signals is achieved in the flight direction according to the synthetic-aperture-radar principle (SAR). The evaluation of the received radar signals follows immediately upon their reception by means of an optimal filter evaluation through a correlation step for determining and acquiring the position of covered ground targets for combating these targets immediately or later.

Advantageously, the described system serves for activating weapons according to the vertical-ballistic-principle (VEBAL) in which a weapon is discharged substantially vertically downwardly, as well as for the reconnaissance and detection of covered ground targets, whereby the acquired data may be stored or transmitted "on line" by radio to other users. According to the preferred embodiment of the invention, strip conductor antennas which are fitted to the contour of the flying body are used as the antennas of the arrays.

BRIEF DESCRIPTION OF THE DRAWINGS

In order that the invention may be clearly understood, it will now be described, by way of example, with reference to the accompanying drawings, wherein:

FIG. 1b is a front or head-on view of the flying body of FIG. 1a;

FIG. 1c is a top view of the flying body of FIG. 1a;

DETAILED DESCRIPTION OF PREFERRED EXAMPLE EMBODIMENTS AND OF THE BEST MODE OF THE INVENTION

Figure 6:
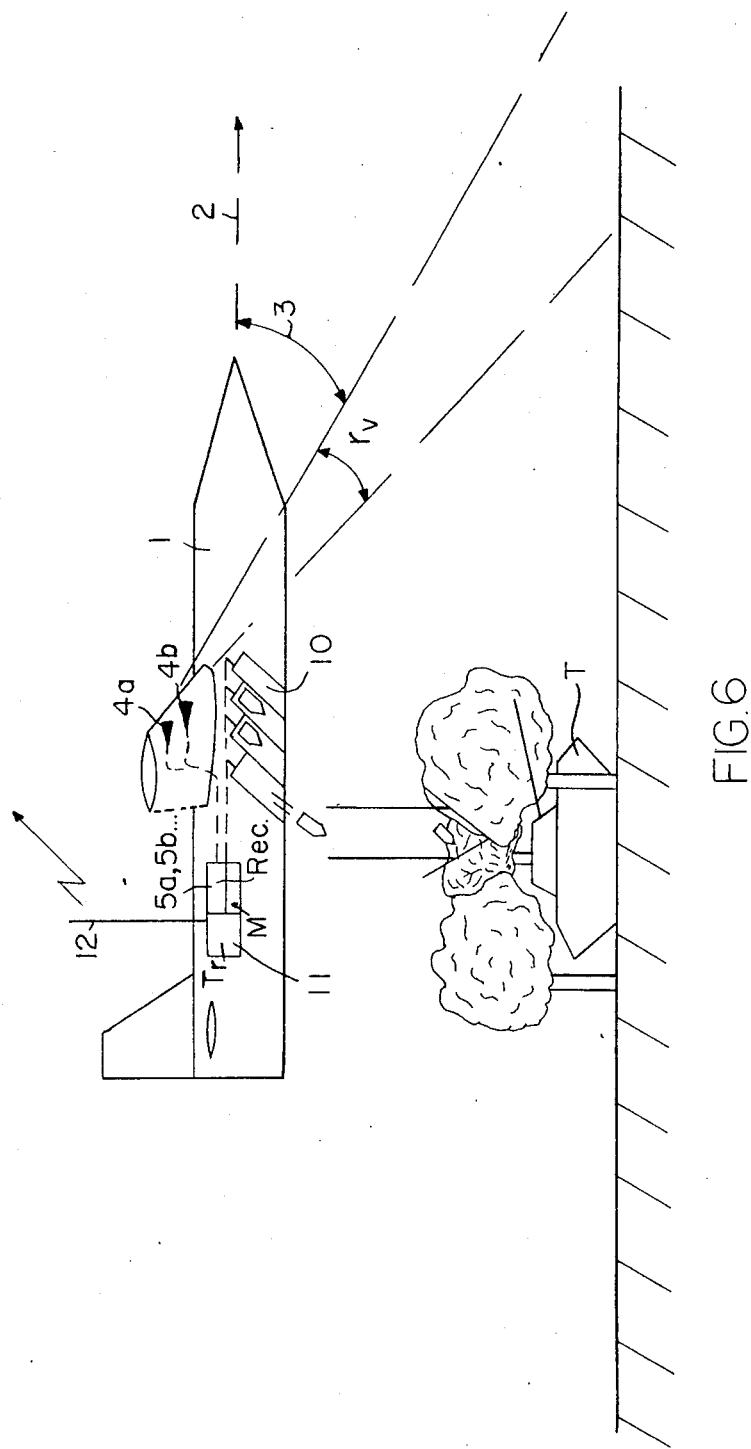
FIG. 6 shows schematically a flying body utilizing the present invention for combating a concealed target.

Referring first to FIG. 6, a flying body 1 has a roll axis 2 in the flight direction and carries a plurality of radar receiver antennas 4a, 4b, 4d . . . , as will be explained in more detail below with reference to the other Figures. The flying body also carries a respective number of radar receivers 5a, 5b, 5d . . . , each connected to its respective receiver antenna. A first radar transmitter 6, shown in FIG. 2, with a transmitter antenna 4c transmits in the operating frequency range of 500 to 1200 MHz. The receivers receive in this operating frequency range. An information storing memory M stores the information processed according to the invention for automatically operating a weapons carrier 10 in response to the control signal produced at the output of the correlators $K_1$, $K_2$ . . . $K_N$ shown in FIG. 3. The weapons carrier 10 as such is conventional and preferably operates in accordance with the known vertical ballistic principle (VEBAL).

The flying body 1 may also carry a transmitter 11 and an antenna 12 for additionally or alternately transmitting the information regarding the detection of a concealed target to other receivers not shown, for example on the ground or on other flying bodies.

Figure 1A:
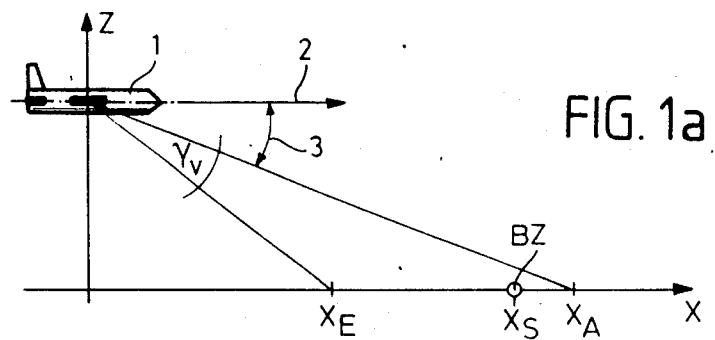
FIG. 1a is a side view of a flying body with a system for detecting covered ground targets.
Figure 1B:
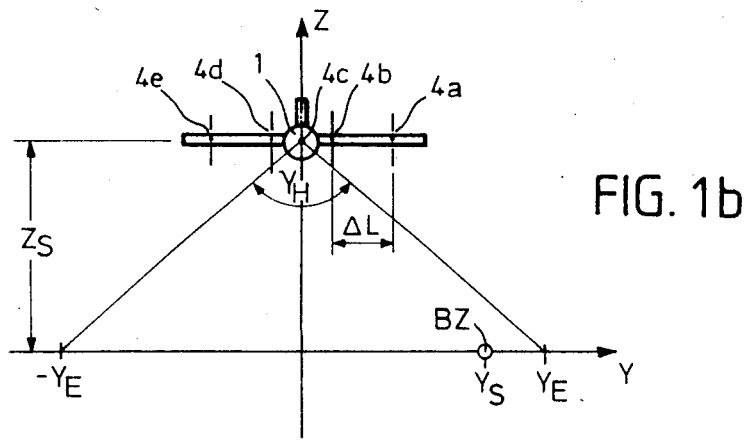
Figure 1C:
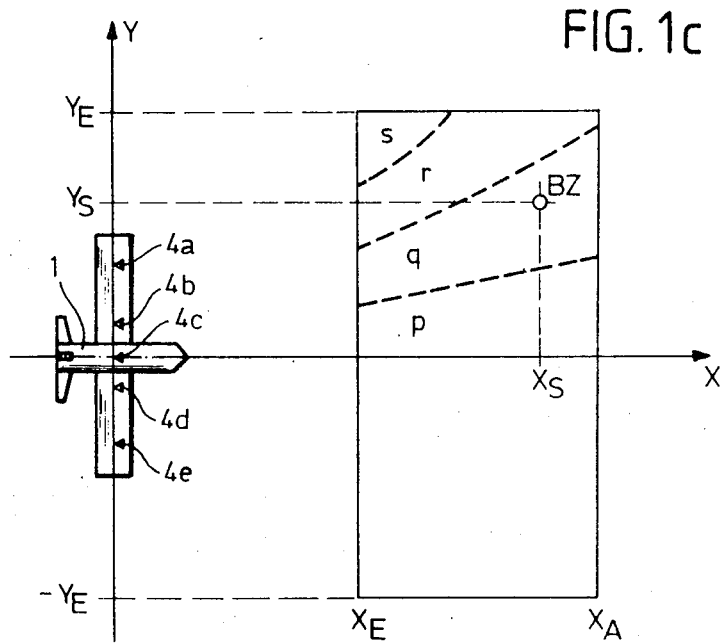

The three views of FIGS. 1a, 1b, and 1c show a geometrical arrangement of a system for detecting and combating covered ground targets by a flying body 1 flying at low altitudes. For purposes of clarification a coordinate system which moves along with the flying body is shown on the earth's surface. The position of a target BZ relative to the coordinate system is given in terms of the lateral distance $X_s$, $Y_s$ in the X/Y-plane. The detection or acquisition zone which is determined by the arrangement of the antennas 4a, 4b, 4c, 4d, 43, by the antenna geometry, and by the flight altitude $Z_s$, is located between the marks $X_E$ and $X_A$ in the flight direction and between the marks $-Y_E$ and $Y_E$ in the cross direction. The half of this detection or acquisition zone, in the positive Y direction, is divided into four resolution sectors p, q, r, s as shown in FIG. 1c. The purpose of these resolution sectors will become apparent from the following description.

A ground target BZ, which is located on the earth's surface within the flight path, is first detected by the radar when its range or distance becomes smaller than the maximum range $X_A$. In the evaluation, only those received signals are taken into account which arise while the distance to the target is reduced to the decision range $X_E$. The information available at the output of the radar device represents the distribution of the scattering bodies located at this moment at the decision range $X_E$ as a function of their lateral deviation distance $Y_s$.

FIGS. 1a, 1b show an antenna geometry wherein respectively the vertical beam angle $\gamma_V$ and the horizontal beam angle $\gamma_H$ lines in the range of:

$30° \leq \gamma_V \leq 70°$; (FIG. 1a)

$25° \leq \gamma_H \leq 65°$; (FIG. 1b).

Smaller antennas with a smaller focussing may also be used. However, then ground targets located outside of the interesting field of view will also be detected, which requries a higher expenditure and accuracy for the signal evaluation. Simultaneously, a smaller focussing leads to a reduction in the resistance to interference distortions (ECM-Resistance), since signals from distant interference targets are received with larger amplitudes and must be suppressed during signal processing.

Figure 2:
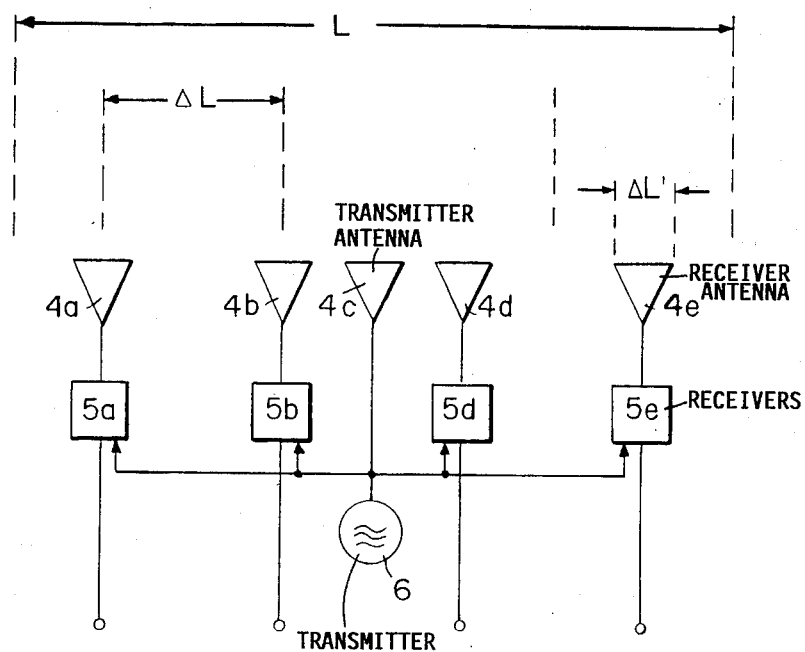
FIG. 2 shows a geometric arrangement of a radar system according to the invention for detecting covered targets.

FIG. 2 shows an example of a possible arrangement of the sending antenna 4c and of the receiving antennas 4a, 4b, 4d, 4e, as well as the receivers 5a, 5b, 5d, 5e of the receiving antennas and the transmitter 6 of the transmitting antenna. Flat antenna structures are necessary for installation in the aircraft. It is therefore possible to achieve the desired antenna diagram or configuration through an arrangement of several λ/2 single radiators which are supplied with an appropriate phase relationship. The overall structure of the antenna may thus advantageously be achieved by strip conductor techniques.

An array of several antennas is necessary for the radar interpretation which is used. It has been found that good results are obtainable with an equi-distant arrangement of four receiver antennas 4a, 4b, 4d, 4e, which are applied in the wing area of the flying body 1. The transmitting antenna 4c is located in the middle of the total aperture. With a sufficiently large decoupling, the combined use of a receiving antenna as a transmitting antenna is also possible. The following dimensions have been found to be useful. The spacing between separate neighboring receiver antennas 4a, 4b, 4d, 4e should be within the range: $1 \text{ m} \leq \Delta L \leq 2 \text{ m}$. The length of the total aperture should be within the range: $4 \text{ m} \leq L \leq 8 \text{ m}$. In other words, the single spacing is considerably larger than in the typical arrays with λ/2 single radiators.

Transmitter powers in the order of magnitude between 2 W and 20 mW have been found to be sufficient. The radar system is currently set up as a continuous wave signal radar system. However, it is also possible to use pulse signals just as well, whereby the transmitted impulse serves only for demarcating the image field zone, in contrast to an ordinary pulse radar, wherein the pulse signal serves to achieve a distance resolution capability.

Figure 3:
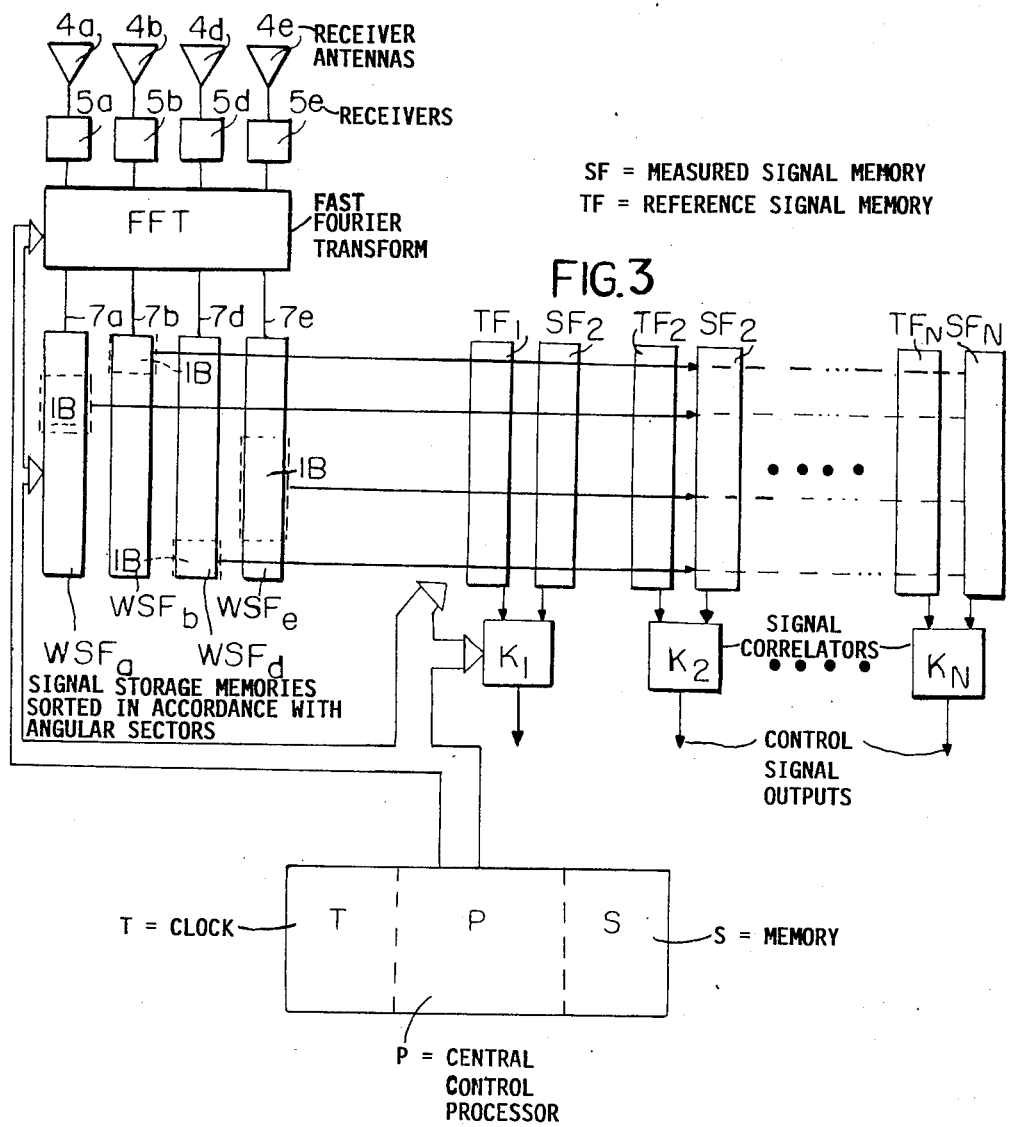
FIG. 3 is a block diagram illustrating the functions performed in practicing the present method.

FIG. 3 shows schematically the processing of the radar signals at the receiver end according to the SAR-principle and with wave front reconstruction in a radar arrangement with four receivers 5a, 5b, 5d, 5e. The complex received radar signals are sampled and digitized at equal time intervals at the receiver output. Then a fast Fourier-Transform FFT with four support values is applied to the four signal values associated with one and the same sampling point. The circuit of the FFT processor for the fast Fourier-Transform may be hard wired.

The signal functions 7a, 7b, 7d, 7e sorted angularly according to resolution sectors, are provided at the output of the FFT processor. Circuits for an FFT processor are known in the art. These signal functions 7a, 7b, 7d, 7e are then stored according to their occurrence in time in the four fields of the angularly arranged signal functions $WSF_a$, $WSF_b$, $WSF_d$, $WSF_e$. The respective circuits may be realized by suitable memories with the required storage capacity.

A ground target BZ, which is detected or acquired by the radar with a certain lateral distance $Y_s$, passes through several resolution sectors p, q, r, s as the flying body approaches and as shown in FIG. 1c. Therefore, the actual signal function SF must be pieced together out of respective segments of the angularly assembled signal functions. The manner of this synthesis or "piecing-together" is only dependent upon the lateral distance.

An intermediate storing of the actual signal functions is not necessary. Rather, the signal functions supplied to the correlators $K_1, \ldots K_N$ (shown in FIG. 3) can be derived by means of hard wired circuits directly from the angularly arranged or ordered signal functions.

The major portion of the memory space is therefore required for storing the reference functions $TF_1, \ldots TF_N$. One such reference data set and one correlator are required for each lateral resolution sector.

When the signal at a respective correlator output exceeds a predetermined threshold value it indicates that at that time a ground target BZ is located at the decision distance $X_E$ at the associated lateral distance of the appropriate sector p, q, r, s.

The optimal form of signal evaluation is typically employed in the SAR-principle. In such an optimal signal evaluation the expected signal (=test function) is correlated to the actually measured signal (=signal function), whereby a high degree of correlation or agreement between the two signals indicates the presence of a ground target. Problems arise due to the additional use of the wave front reconstruction, because a ground target approaching parallel to the X-axis passes through several resolution sectors p, q, r, s dependent upon its lateral displacement distance $Y_s$. This fact requires a special method of correlating the signal and test functions, as described above. It has been found that the arrangement of four receivers for the wave front reconstruction is economically feasible and also sufficiently accurate in resolution.

The special advantages of this method are seen in that for the first time it has become possible to discover, to locate, and to aim an attack at military ground targets which may be fully camouflaged, for instance covered by trees, from a manned or unmanned flying body. A similar effect could be achieved heretofore only through the use of a considerable number of surface saturation weapons.

Referring further to FIG. 3, a central control processor P comprising a conventional computer and a clock signal generator as well as a memory is connected for performing the above described functions. Thus, the lines and databus lines are not to be considered as hardware connecting circuit conductors. The block FFT represents a fast Fourier transform which as such is well known in the art. The Fourier transformation reconstructs the wave front of the received radar signals for producing a reconstructed signal function which is used herein as the measured signals which are compared with the reference signal function representing a target signature. The reconstructed output signals 7a, 7b, 7d, and 7e are arranged in angular relationship relative to each other in the same manner as the receiver antennas 4a, 4b, 4d and 4e. Stated differently, each reconstructed output signal 7a to 7e corresponds to or is defined by a given angular range as shown in FIG. 1c.

The blocks $WSF_a$ to $WSF_e$ store the respective signals in the form of information or data blocks IB shown by dashed lines in FIG. 3. The number of signal storage memories WSF corresponds to the number of receiving channels. The storage of the signals takes place in timed sequence. The information blocks IB are then assembled in the SF memories for the measured signal. This information assembly takes place under the control of the central processor P.

The TF memories have stored therein the above mentioned reference signal function representing target signatures. These several reference signal functions may be produced in several ways. Such functions may be measured with the present system by flying over concealed targets such as a tank T shown in FIG. 6 and thereby producing the respective reference signal functions. In an alternate way the reference signal functions may be produced by computer simulation which as such is well known. Such functions may also be produced with the use of models. Normally, such reference signal functions will comprise different aspects of the same target, for example, they will comprise information regarding different approach angles and different approach directions. Under the control of the central processor P the measured signal functions from the memories SF and the reference signal functions from the memories TF are transferred for correlation in the correlators $K_1$ to $K_N$. This signal transfer for the purpose of correlation takes place in accordance with a clock signal from the clock generator T. Incidentally, the transfer of the information blocks IB from the memories WSF into the measured signal memories SF also takes place in a timed sequence, whereby the information blocks IB are combined with each other in the respective SF memory. The arrows leading into the memory $SF_2$ are to indicate that presently the information blocks are combined in the memory $SF_2$. Further, each memory WSF holds many information blocks IB, although only one is shown in each memory WSF.

The purpose of the correlators $K_1$ and $K_2$ is to measure an optimal or even maximal coincidence between the reference signal function and the measured signal function. If that takes place, a target has been detected and a respective control signal output appears at the corresponding signal correlator. This control signal output may be referred to as the correlation coefficient providing a measure or degree for the coincidence between the measured signal function and the reference signal function.

It should be kept in mind in this connection that the information blocks IB represent the information measured at a particular measuring point of time so that, as mentioned, each memory WSF holds a plurality of such information blocks IB because the respective information is ascertained or measured at each point of time as determined by the clock signal. The information blocks have been shown in different sizes, thereby signifying different types of information, for example, the degree of the measured Doppler signal phase shift. It should also be kept in mind that all outputs of the memories or blocks WSF are connected, or rather, intermeshed with each of the SF memories.

The above mentioned correlation is here preferably a signal multiplication of the two signal functions to ascertain the maximal signal correspondence or coincidence. This correlation is actually a continuous comparing of what the radar "sees" through its continuous measurements with the stored reference signal function to ascertain whether there is any signal correspondence. When the signals correspond above a certain threshold level, a target has been detected and located.

Figure 4:
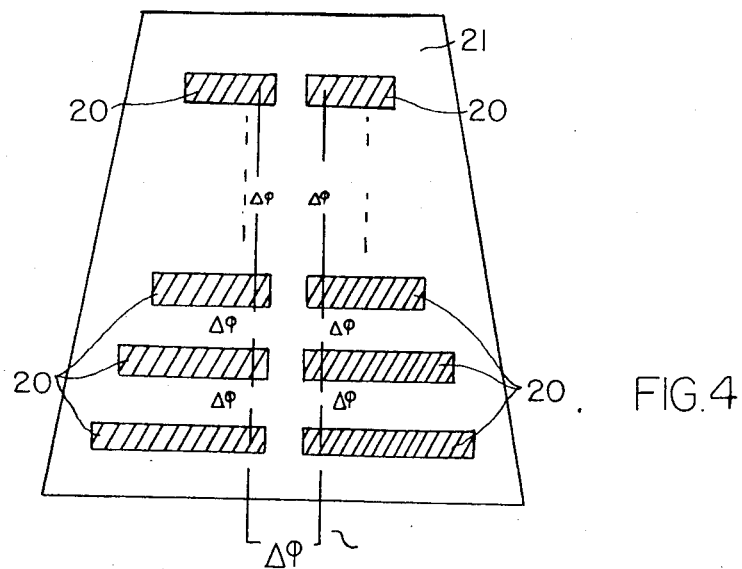
FIG. 4 is an example of an array of receiver antenna dipoles as used according to the invention.

FIG. 4 shows one possible embodiment of an antenna array that may be used for the present receiver antennas. A plurality of strip conductors 20 are secured to a flexible foil 21, for example by well known printed circuit techniques. Pairs of these conductors 20 form dipoles as shown which are interconnected with the phase shift spacing $\Delta\phi$. The foil 21 is sufficiently flexible together with the strip conductors 20 so that it may be attached to a wing of an aircraft, for example, by adhesive bonding so that the antenna will aerodynamically hug the outer contour of the wing surface. The foil, or rather substrate 21 may, for example, be a fiber composite material. Glass fibers embedded in a suitable resin may be used. The lengths of the conductor strips 20 forming the dipoles preferably extend in parallel to the flight direction or roll axis 2.

Figure 5:
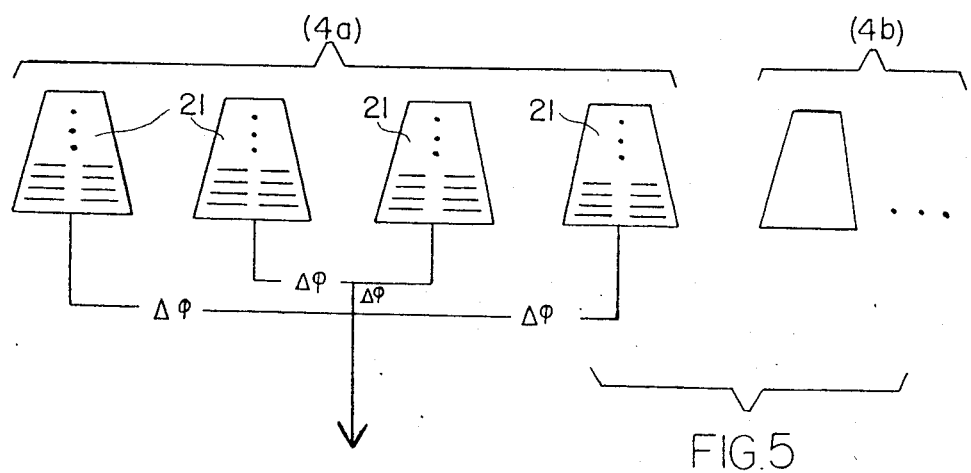
FIG. 5 shows how each receiver antenna may comprise a plurality of antenna dipole arrays.

FIG. 5 shows that each receiver antenna 4a, 4b may, for example, comprise four antenna arrays as shown in FIG. 4.

Although the invention has been described with reference to specific example embodiments, it will be appreciated, that it is intended to cover all modifications and equivalents within the scope of the appended claims.

What we claim is:

1. A method for detecting concealed ground targets with the aid of transmitter receiver means including transmitter antenna means and arrays of receiver antenna means installed on a flying body having a longitudinal roll axis extending in a forward flight direction, comprising the following steps:
   (a) installing said transmitter antenna means and said arrays of receiver antenna means, operable in an operating frequency range of 500 to 1200 Mhz, on said flying body so that at least said receiver antenna means face forwardly and downwardly within a predetermined angular range relative to the horizontal coinciding with said longitudinal roll axis extending in said forward flight direction,
   (b) spacing said arrays of receiver antenna means, in a direction extending across said forward flight direction, from one another at a spacing ($\Delta L$) which is substantially larger than one-half of the wave length corresponding to an operting frequency in said operating frequency range,
   (c) storing in a memory on said flying body several reference signal functions which represent different target signatures,
   (d) transmitting continuous wave signals through said transmitter antenna means and receiving reflected radar signals through said arrays of receiver antenna means,
   (e) evaluating received radar signals reflected from a target in an azimuth plane in said forward flight direction by first sorting received radar signals according to angular sectors to produce sorted signals, and then applying a reconstruction procedure in accordance with a synthetic-aperture-radar principle to the sorted signals for producing a reconstructed signal function,
   (f) and directly correlating said reconstructed signal function with said several reference signal functions for producing a control signal output signifying the presence of a concealed target.

2. The method of claim 1, further comprising using said control signal output for triggering a weapons carrier on said flying body for discharging a weapon substantially directly downwardly toward a detected target.

3. The method of claim 1, further comprising processing said reconstructed signal function so that said control signal output comprises target position information in addition to signifying the presence of a concealed target.

* * * * *